United States Patent
Qian et al.

(10) Patent No.: US 10,699,697 B2
(45) Date of Patent: *Jun. 30, 2020

(54) KNOWLEDGE TRANSFER IN PERMUTATION INVARIANT TRAINING FOR SINGLE-CHANNEL MULTI-TALKER SPEECH RECOGNITION

(71) Applicant: TENCENT TECHNOLOGY (SHENZHEN) COMPANY LIMITED, Shenzhen, Guangdong (CN)

(72) Inventors: Yanmin Qian, Shanghai (CN); Dong Yu, Bothell, WA (US)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 141 days.

This patent is subject to a terminal disclaimer.

(21) Appl. No.: 15/940,197

(22) Filed: Mar. 29, 2018

(65) Prior Publication Data

US 2019/0304437 A1  Oct. 3, 2019

(51) Int. Cl.
*G10L 15/00* (2013.01)
*G10L 15/06* (2013.01)

(52) U.S. Cl.
CPC .................. *G10L 15/063* (2013.01)

(58) Field of Classification Search
CPC ...................................................... G10L 15/00
USPC ........... 704/243, 9, 235, 233, 234, 202, 226; 707/747; 706/25, 20
See application file for complete search history.

(56) References Cited

U.S. PATENT DOCUMENTS

| | | | |
|---|---|---|---|
| 9,620,108 B2* | 4/2017 | Sak | G10L 15/02 |
| 9,786,270 B2* | 10/2017 | Senior | G10L 15/063 |
| 9,799,327 B1* | 10/2017 | Chan | G06F 40/12 |
| 9,818,431 B2* | 11/2017 | Yu | G10L 25/30 |
| 9,858,919 B2 | 1/2018 | Saon | |
| 10,032,498 B2* | 7/2018 | Neil | G06N 3/0445 |
| 10,255,905 B2* | 4/2019 | Chua | G10L 13/10 |
| 10,381,020 B2* | 8/2019 | Ramprashad | G10L 21/0232 |
| 10,387,769 B2* | 8/2019 | Neil | G06N 3/08 |
| 10,460,727 B2* | 10/2019 | Droppo | G10L 15/063 |
| 2011/0173208 A1* | 7/2011 | Vogel | G10L 25/48 707/746 |
| 2014/0257803 A1 | 9/2014 | Yu et al. | |
| 2016/0034812 A1* | 2/2016 | Gibson | G06N 3/08 706/25 |

(Continued)

OTHER PUBLICATIONS

Dong Yu et al., "Recognizing Multi-talker Speech with Permutation Invariant Training", INTERSPEECH 2017, pp. 2456-2460.

(Continued)

*Primary Examiner* — Michael Colucci
(74) *Attorney, Agent, or Firm* — Sughrue Mion, PLLC (57) ABSTRACT

Provided are a speech recognition training processing method and an apparatus including the same. The speech recognition training processing method includes acquiring a multi-talker mixed speech signal from a plurality of speakers, performing permutation invariant training (PIT) model training on the multi-talker mixed speech signal based on knowledge from a single-talker speech recognition model and updating a multi-talker speech recognition model based on a result of the PIT model training.

19 Claims, 5 Drawing Sheets

(56) References Cited

U.S. PATENT DOCUMENTS

| | | | |
|---|---|---|---|
| 2016/0098632 A1* | 4/2016 | Sutskever | G06N 3/0445 706/25 |
| 2016/0111108 A1* | 4/2016 | Erdogan | G10L 21/0216 704/202 |
| 2016/0180215 A1* | 6/2016 | Vinyals | G06F 40/205 706/20 |
| 2017/0337924 A1* | 11/2017 | Yu | G06K 9/6246 |
| 2017/0372200 A1* | 12/2017 | Chen | G06N 3/08 |
| 2018/0060301 A1* | 3/2018 | Li | G06F 40/35 |
| 2018/0157743 A1* | 6/2018 | Hori | G06N 3/0445 |
| 2018/0233130 A1* | 8/2018 | Kaskari | G10L 15/063 |
| 2018/0247639 A1* | 8/2018 | Liu | G10L 15/063 |
| 2018/0254040 A1* | 9/2018 | Droppo | G10L 17/18 |
| 2018/0336884 A1* | 11/2018 | Sriram | G10L 15/183 |
| 2019/0042932 A1* | 2/2019 | Bhat | G06F 17/18 |
| 2019/0122101 A1* | 4/2019 | Lei | G06F 17/16 |
| 2019/0130628 A1* | 5/2019 | Cao | G06K 9/00201 |
| 2019/0139563 A1* | 5/2019 | Chen | G10L 21/0216 |
| 2019/0304437 A1* | 10/2019 | Qian | G10L 15/063 |
| 2019/0304438 A1* | 10/2019 | Qian | G10L 15/07 |

OTHER PUBLICATIONS

Chen, Zhehuai et al.; Progressive Joint Modeling in Unsupervised Single-channel Overlapped Speech Recognition. arXiv: 1707.07048 [cs.CL], 2017 [online], [retrieved on May 28, 2019]. Retrieved from the Internet <URL:https://arxiv.org/pdf/1707.07048.pdf>; pp. 1-14.
Tan, Tian et al. Knowledge Transfer in Permutation Invariant Training for Single-Channel Multi-Talker Speech Recognition. 2018 IEEE International Conference on Acoustics, Speech and Signal Processing (ICASSP), 2018 [online], [retrieved on May 28,2019]. Retrieved from the Internet <URL:https://speechlab.sjtu.edu.cn/papers/tt123-tan-icassp18.pdfxDOI:10.1109/ICASSP.2018. 8461883>; pp. 5.
PCT/IS A/210; International application No. PCT/US 19/24781; dated Mar. 29, 2019; pp. 2.
Kenny, Patrick et al., "Eigenvoice Modeling With Sparse Training Data", IEEE Transactions on Speech and Audio Processing, May 2005, pp. 345-354, vol. 13, No. 3.
Yu, Dong et al., Permutation Invariant Training of Deep Models for Speaker-Independent Multi-Talker Speech Separation, IEEE, ICASSP, 2017, pp. 241-245.
Qian, Yanmin et al., "Very Deep Convolutional Neural Networks for Noise Robust Speech Recognition", IEEE/ACM Transactions on Audio, Speech, and Language Processing, Dec. 2016, pp. 2263-2276, vol. 24, No. 12.
Qian, Yanmin et al., "Single-Channel Multi-talker Speech Recognition with Permutation Invariant Training", IEEE/ACM Transactions on Audio, Speech, and Language Processing, Jul. 19, 2017, pp. 1-11.
Abdel-Hamid, Ossama et al., "Convolutional Neural Networks for Speech Recognition", IEEE/ACM Transactions on Audio, Speech, and Language Processing, Oct. 2014, pp. 1533-1545, vol. 22, No. 10.
Kolbaek, Morten et al., "Multitalker Speech Separation With Utterance-Level Permutation Invariant Training of Deep Recurrent Neural Networks", IEEE/ACM Transactions on Audio, Speech, and Language Processing, Oct. 2017, pp. 1901-1913, vol. 25, No. 10.
Ghahremani, Pegah et al., "A Pitch Extraction Algorithm Tuned for Automatic Speech Recognition", IEEE International Conference on Acoustic, Speech and Signal Processing (ICASSP), 2014, pp. 2494-2498.
Sainath, Tara N et al., "Deep Convolutional Neural Networks for Large-scale Speech Tasks", Neural Networks 64, 2015, pp. 39-48.
Yu, Dong et al., "Deep Convolutional Neural Networks with Layer-wise Context Expansion and Attention", INTERSPEECH, ISCA, Sep. 8-12, 2016, pp. 17-21, San Francisco, USA.
International Search Report issued in International Application No. PCT/US2019/024777 dated Jul. 15, 2019, 2 pages.
Ba, Jimmy, et al., "Do Deep Nets Really Need to be Deep?", in NIPS, 2014, pp. 1-10.
Li, Jinyu et al, "Learning Small-Size DNN with Output-Distribution-Based Criteria", in INTERSPEECH, 2014; 5 pages.
Chan, William, et al., "Transferring knowledge from a RNN to a DNN", in INTERSPEECH, 2015; 5 pages.
Hinton, Geoffrey, et al., "Distilling the Knowledge in a Neural Network", CoRR, vol. abs/1503.02531, 2015; pp. 1-9.
Lu, Liang, et al., "Knowledge distillation for small-footprint highway networks", in ICASSP. IEEE, 2017, pp. 4820-4824.
Watanabe, Shinji, et al., "Student-teacher network learning with enhanced features", in INTERSPEECH, 2017, pp. 5275-5279.
Li, Jinyu, et al., "Large-Scale Domain Adaptation via Teacher-Student Learning", in INTERSPEECH, 2017, pp. 2386-2390.
Chebotar, Yevgen et al., "Distilling knowledge from ensembles of neural networks for speech recognition", in INTERSPEECH, 2016, pp. 3439-3443.
Xiong et al., "The Microsoft 2016 conversational speech recognition system", in ICASSP, 2017, pp. 5255-5259.
Ghahramani, Zoubin, et al., "Factorial hidden Markov Models", Machine Learning 1997, pp. 1-31.
Cooke, Martin, et al., "Monaural speech separation and recognition challenge", Computer Speech & Language, 2009, vol. 24, No. 1, pp. 1-23.
Weng, Chao, et al., "Deep Neural Networks for Single-Channel Multi-Talker Speech Recognition", TASLP, vol. 23, No. 10, pp. 1670-1679, 2015.
Hershey, J. R., et al., "Deep clustering: Discriminative embeddings for segmentation and separation", ICASSP, Mar. 2016, pp. 31-35.
Isik et al., "Single-Channel Multi-Speaker Separation using deep Clustering", in INTERSPEECH, Sep. 2016, pp. 545-549.
Chen, Zhuo, et al., "Deep Attractor Network for Single-Microphone Speaker Separation", in ICASSP, 2017, pp. 246-250.
Swietojanski, Pawel, et al., "Learning Hidden Unit Contributions for Unsupervised Speaker Adaptation of Neural Network Acoustic Models", SLT. IEEE, 2014, pp. 171-176.
M. J .F. Gales, "Maximum Likelihood Linear Transformations for HMM-Based Speech Recognition", Computer Speech and Language, vol. 12, pp. 75-98, 1998.
Yao, Kaisheng, et al., "Adaptation of Context-Dependent Deep Neural Networks for Automatic Speech Recognition", SLT. IEEE, 2012, pp. 366-369.
Siniscalchi, Sabato Marco, et al., "Hermitian Polynomial for Speaker Adaptation of Connectionist Speech Recognition Systems", TASLP, vol. 21, No. 10, pp. 1-10, 2013.
Yu, Dong, et al., "KL-Divergence Regularized Deep Neural Network Adaptation for Improved Large Vocabulary Speech Recognition", ICASSP, IEEE, 2013, pp. 7893-7897.
Seltzer, Michael L., et al., "An Investigation of Deep Neural Networks for Noise Robust Speech Recognition", ICASSP. IEEE, 2013, pp. 7398-7402.
Giri, Ritwik, et al., "Improving Speech Recognition in Reverberation Using a Room-Aware Deep Neural Network and Multi-Task Learning", ICASSP. IEEE, 2015, pp. 5014-5018.
De Cheveigné, Alain, et al., "Yin, a fundamental frequency estimator for speech and music", The Journal of the Acoustical Society of America, vol. 111, No. 4, pp. 1917-1930, 2002.
Talkin, David, "A Robust Algorithm for Pitch Tracking (RAPT)", Speech Coding and Synthesis, Chapter 14, 1995, 495-518.
Wu, Mingyang, et al., "A Multipitch Tracking Algorithm for Noisy Speech", TSAP, vol. 11, No. 3, pp. I-369-I-372, 2002.
Camacho, Arturo, "Swipe: A Sawtooth Waveform Inspired Pitch Estimator for Speech and Music", University of Florida; pp. 1-116, 2007.
Gupta, Vishwa, et al., "I-Vector-Based Speaker Adaptation of Deep Neural Networks for French Broadcast Audio Transcription", ICASSP. IEEE, 2014, pp. 6334-6338.
Qian, Yanmin, et al., "Very Deep Convolutional Neural Networks for Robust Speech Recognition", SLT. IEEE, Oct. 2, 2016, pp. 481-488.
Wang, Yannan, et al., "A Gender Mixture Detection Approach to Unsupervised Single-Channel Speech Separation Based on Deep Neural Networks", TASLP, vol. 25, No. 7, pp. 1535-1546, 2017.

(56) References Cited

OTHER PUBLICATIONS

Povey, Daniel, et al., "The Kaldi Speech Recognition Toolkit", ASRU, 2011, No. EPFL-CONF-192584; 4 pages.
Agarwal, Amit, et al., "An Introduction to Computational Networks and the Computational Network Toolkit", Tech. Rep., Microsoft Technical Report MSR-TR-2014-112, 2016, 150 pages.
Seide, Frank, et al., "1-Bit Stochastic Gradient Descent and Its Application to Data-Parallel Distributed Training of Speech DNNs", INTERSPEECH, 2014, pp. 1058-1062.
Yu, Dong, et al., Automatic Speech Recognition: A Deep Learning Approach, Springer, 2015, 329 pages.

* cited by examiner

KNOWLEDGE TRANSFER IN PERMUTATION INVARIANT TRAINING FOR SINGLE-CHANNEL MULTI-TALKER SPEECH RECOGNITION

BACKGROUND

1. Field

The present disclosure relates to methods and apparatus for performing speech recognition, particularly, adaptive permutation invariant training for multi-talker speech recognition.

2. Description of the Related Art

In related art, many attempts have been made to address a "label ambiguity" or a "label permutation" problem in a speech recognition scenario where multiple talkers speak at the same time and only a single channel of mixed speech is available, but the results have been unsatisfactory. For instance, Non-patent Literature (NPL) document 1 describes a deep learning model to recognize the mixed speech directly by assigning the senone labels of the talkers according to the energy of the speech. To deal with the speaker switch problem, NPL document 1 describes using a two-talker joint-decoder with a speaker switching penalty was used to trace speakers. Further, NPL document 2 describes a technique called deep clustering (DPCL) to separate the speech streams by mapping a speaker's time-frequency bins into an embedding space where the bins belong to the same speakers are close and that of different speakers are far away from each other. Moreover, NPL document 3 describes a technique called deep attractor network (DANet) which learns a high-dimensional embedding of the acoustic signals and clustered embeddings with attractor points.

Despite the progresses made in monaural multi-talker speech recognition, the word error rates (WER) reported in previous works are still much higher than that in single-talker cases. In single-talker speech recognition, speaker adaptation reduces the mismatch between the training and the test speakers and improves the WER for the test speakers.

NPL DOCUMENTS

NPL document 1: Chao Weng, Dong Yu, Michael L. Seltzer, and Jasha Droppo, "Deep neural networks for single-channel multi-talker speech recognition," TASLP, vol. 23, no. 10, pp. 1670-1679, 2015.

NPL document 2: J. R. Hershey, Z. Chen, J. Le Roux, and S. Watanabe, "Deep clustering: Discriminative embeddings for segmentation and separation," in ICASSP, 2016, pp. 31-35.

NPL document 3: Zhuo Chen, Yi Luo, and Nima Mesgarani, "Deep attractor network for single-microphone speaker separation," in ICASSP, 2017, pp. 246-250.

SUMMARY

Provided are methods of performing Teacher-Student (TS) permutation invariant training (PIT) framework for multi-talker speech recognition, and apparatuses for performing the same.

One or more embodiments of the present disclosure discloses novel teach-student techniques which transfer knowledge from a single-talker ASR model to a multi-talker ASR model in the PIT framework. For instance, according to one or more embodiments, the inputs to the teacher and student networks are the single-talker clean speech and the multi-talker mixed speech, respectively, and the knowledge is transferred to the student through the soft labels estimated by the teacher. Furthermore, according to one or more embodiments, a newly designed model training pipeline may be constructed, which includes several features such as using the ensemble of multiple teachers, and applying a progressive training scheme to further improve the system. Moreover, according to one or more embodiments, a new framework can be utilized to perform data augmentation and domain adaptation for multi-talker speech recognition using only un-transcribed data, which will further improve the system performance.

According to an aspect of an embodiment, there is provided a method of performing speech recognition training, the method comprising: acquiring a multi-talker mixed speech signal from a plurality of speakers; performing permutation invariant training (PIT) model training on the multi-talker mixed speech signal based on knowledge from a single-talker speech recognition model; and updating a multi-talker speech recognition model based on a result of the PIT model training.

The single-talker speech recognition model maybe a teacher model, and the multi-talker speech recognition model maybe a student model.

The PIT model training may use labels from the single-talker speech recognition model, the labels being posteriors from inputting a single-talker data corresponding to one or more of the plurality of speakers into the single-talker speech recognition model.

The method may further comprise: performing PIT model training on a single talker feature corresponding to one or more of the plurality of speakers; and transferring posteriors from the performing the PIT model training on the single talker feature as soft label input for the multi-talker speech recognition model.

The performing PIT model training may comprise: performing a bidirectional long-short term memory (BLSTM) operation on the multi-talker mixed speech signal by assigning soft labels that are posteriors from inputting a single-talker data corresponding to one or more of the plurality of speakers into the single-talker speech recognition model and generating a plurality of estimated output segments for multi-talker mixed speech signal; and minimizing a minimal average cross entropy (CE) for utterances of all possible assignments between the plurality of estimated output segments and soft labels.

The minimal average cross entropy (CE) maybe determined based on the following equations:

$$J = \frac{1}{S} \min_{s' \in permu(S)} \sum_s \sum_t \sum_y p'(y \mid o_t^{s'_s}) \log p_\theta^s(y \mid o_t) \quad (1)$$

$$p'(y \mid o_t^{s'_s}) = \lambda p_{teacher}(y \mid o_t^{s'_s}) + (1-\lambda) p_{t,s'_s}^{ref}(y) \quad (2)$$

where $$p_\theta^s(y \mid o_t)$$

is posterior of stream s estimated by the multi-talker speech recognition model, $$p_{t,s'_s}^{ref}(y) = \delta(y, l_t^{s'_s})$$

is a reference distribution, and $$p_{teacher}(y \mid o_t^{s'_s})$$

is posterior estimated by the single-talker speech recognition model using original single-talker speech stream s'$_s$.

The PIT model training may comprise: performing a bidirectional long-short term memory recurrent neural networks (BLSTM-RNN) operation on the multi-talker mixed speech signal by assigning soft labels that are posteriors from the single-talker speech recognition model.

The soft label may be generated using an ensemble of a plurality of different single-talker speech recognition models such that $$p_{teacher}(y \mid o_t^{s'_s}) = \sum_k w_k p_k(y \mid o_t^{s'_s})$$

wherein $$w_k \in [0, 1] \text{ and } \sum_k w_k = 1$$

are interpolation weights and $$p_k(y_t^{s'_s} \mid o_t)$$

is the posterior estimated by the different plurality of single-talker speech recognition models.

The soft label is generated using an ensemble of a plurality of different single-talker speech recognition models one by one, in ascending order of recognition performance on corresponding single-talker tasks.

According to an aspect of another embodiment, there is provided a speech recognition training apparatus comprising: a memory; and a processor configured to: acquire a multi-talker mixed speech signal from a plurality of speakers; perform permutation invariant training (PIT) model training on the multi-talker mixed speech signal based on knowledge from a single-talker speech recognition model; and update a multi-talker speech recognition model based on a result of the PIT model training.

The single-talker speech recognition model maybe a teacher model, and the multi-talker speech recognition model maybe a student model.

The PIT model training may use labels from the single-talker speech recognition model, the labels being posteriors from inputting a single-talker data corresponding to one or more of the plurality of speakers into the single-talker speech recognition model.

The processor maybe further configured to: perform PIT model training on a single talker feature corresponding to one or more of the plurality of speakers; and transfer posteriors from the performing the PIT model training on the single talker feature as soft label input for the multi-talker speech recognition model.

The processor maybe further configured to: perform a bidirectional long-short term memory (BLSTM) operation on the multi-talker mixed speech signal by assigning soft labels that are posteriors from inputting a single-talker data corresponding to one or more of the plurality of speakers into the single-talker speech recognition model and generating a plurality of estimated output segments for multi-talker mixed speech signal; and minimize a minimal average cross entropy (CE) for utterances of all possible assignments between the plurality of estimated output segments and soft labels.

The minimal average cross entropy (CE) maybe determined based on the following equations:

$$J = \frac{1}{S} \min_{s' \in permu(S)} \sum_s \sum_t \sum_y p'(y \mid o_t^{s'_s}) \log p_\theta^s(y \mid o_t) \qquad (1)$$

$$p'(y \mid o_t^{s'_s}) = \lambda p_{teacher}(y \mid o_t^{s'_s}) + (1 - \lambda) p_{t,s'_s}^{ref}(y) \qquad (2)$$

where $$p_\theta^s(y \mid o_t)$$

is posterior of stream s estimated by the multi-talker speech recognition model, $$p_{t,s'_s}^{ref}(y) = \delta(y, l_t^{s'_s})$$

is a reference distribution, and $$p_{teacher}(y \mid o_t^{s'_s})$$

is posterior estimated by the single-talker speech recognition model using original single-talker speech stream s'$_s$.

The PIT model training may comprise: performing a bidirectional long-short term memory recurrent neural networks (BLSTM-RNN) operation on the multi-talker mixed speech signal by assigning soft labels that are posteriors from the single-talker speech recognition model.

The soft label maybe generated using an ensemble of a plurality of different single-talker speech recognition models such that $$p_{teacher}(y \mid o_t^{s'_s}) = \sum_k w_k p_k(y \mid o_t^{s'_s})$$

wherein $$w_k \in [0, 1] \text{ and } \sum_k w_k = 1$$

are interpolation weights and $$p_k(y_t^{s_s'} | o_t)$$

is the posterior estimated by the different plurality of single-talker speech recognition models.

The soft label may be generated using an ensemble of a plurality of different single-talker speech recognition models one by one, in ascending order of recognition performance on corresponding single-talker tasks.

According to an aspect of another embodiment, there is provided a non-transitory computer readable medium having stored thereon a program for a method of performing speech recognition, the method comprising: acquiring a multi-talker mixed speech signal from a plurality of speakers; performing permutation invariant training (PIT) model training on the multi-talker mixed speech signal based on knowledge from a single-talker speech recognition model; and updating a multi-talker speech recognition model based on a result of the PIT model training.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout.

Hereinafter, TS PIT processing methods and apparatuses according to embodiments will be described in detail with reference to the accompanying drawings. The term such as "comprise" or "include" used herein should not be construed as necessarily including all of the elements or operations (or steps) described herein, and should be construed as not including some of the described elements or operations (or steps) or as further including additional elements or operations (or steps).

Although terms such as "first" and "second" may be used herein to describe various elements or components, the elements or components should not be limited by the terms. These terms are only used to distinguish one element or component from another element or component.

One or more embodiments of the present disclosure may address the multi-talker speech recognition, which recognize the multi-talker mixed overlap speech, in the scenario, such as cocktail party environment or other group environment.

Figure 1A:
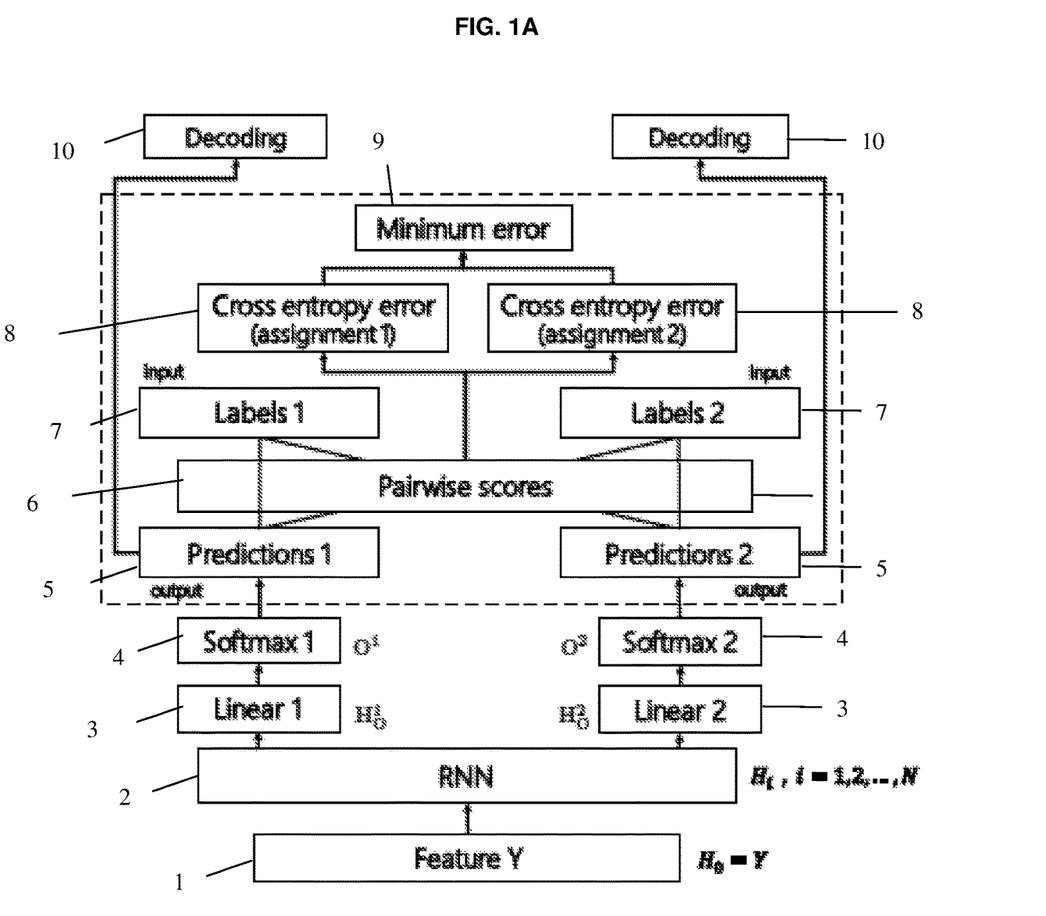
FIG. 1A is a block diagram illustrating a PIT architecture for speech recognition training.
Figure 1B:
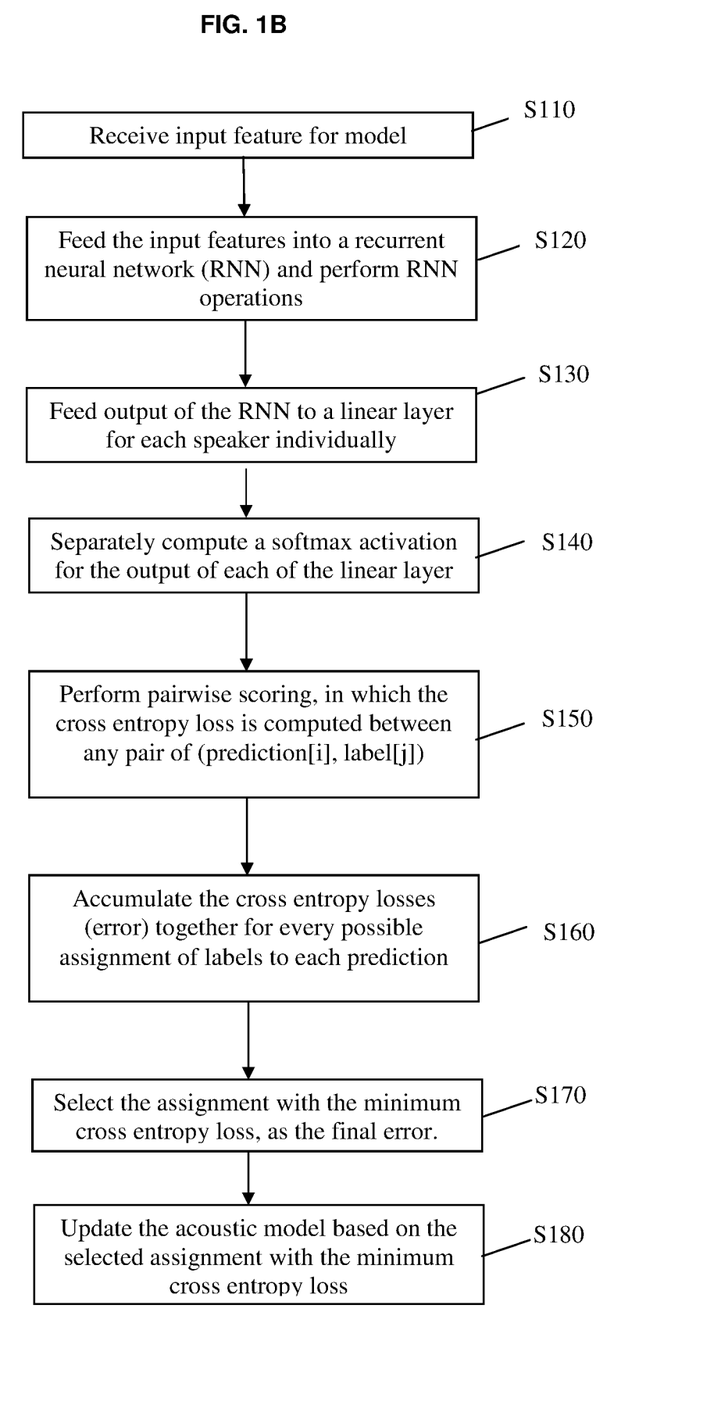
FIG. 1B is flowchart illustrating operations of a PIT architecture for speech recognition training.

Permutation invariant training (PIT) is a technique for solving the label ambiguity problem in deep learning based multi-talker speech recognition. The basic architecture of PIT for multi-talker automatic speech recognition (PIT-ASR) is depicted in FIG. 1A. In this model, the mixed speech O is sent to the deep learning model to estimate the state-level posterior for each talker. For better ability of modeling long-range dependency, which can improve speaker tracing, recurrent neural networks (RNNs) are usually used. In FIGS. 1A and 1B, bidirectional long-short term memory RNNs (BLSTM-RNNs) are applied in all models.

According to PIT technique illustrated in FIG. 1A, layer 1 represents an input feature Y for the model. In layer 2, the input features are fed into a recurrent neural network (RNN) in layer 2. The RNN layer 2 may further include bidirectional long-short term memory RNNs (BLSTM-RNNs). Next, in linear layer 3, the output of the RNN layer 2 may go through linear1 and linear2 for each speaker individually. For instance, a first output of the RNN layer 2 corresponding to a first speaker may be input through a linear1 and a second output of the RNN layer 2 corresponding to a second speaker may be input through a linear2. Thereafter, the outputs from the linear layer 3, i.e., linear1 and linear2, are fed into softmax1 and softmax 2, respectively, of the softmax layer 4, which computes a softmax activation. The softmax activation may be referred to as the senone posteriori in speech recognition tasks. The output of the softmax activation in softmax1 and softmax2 may be considered as predictions1 and predictions2 in prediction layer 5.

Next, in input layer 7, label inputs for the input features Y are input as labels1 and labels2. In pairwise scoring layer 6, pairwise scoring is performed, in which the cross entropy loss is computed between any pair of (prediction[i], label[j]), where i and j may be 1, ..., n. For instance, in illustrative FIG. 1A, the cross entropy loss may be computed between (predictions1, labels1), (predictions1, labels2), (prediction2, labels1) and (prediction2, labels2). In assignment layer 8, the cross entropy losses (error) are accumulated together for every possible assignment of labels to each prediction, which is the permutations of labels' order. For instance, in assignment1, the cross entropy losses (error) are accumulated together for every possible assignment of labels to predictions1 and in assignment2, the cross entropy losses (error) are accumulated together for every possible assignment of labels to prediction2. In layer 9, assignment, among assignment1 and assignment2, with the minimum cross entropy loss is selected as the final error. Accordingly, the model is updated based on the determined final error. Also, the prediction result from the updated model may be used for decoding an input speech data in decoding layer 10.

According to an embodiment, one or more of the layers may be implemented by one or more units or modules. Moreover, each or the one or more units or modules may be implemented by a hardware processor.

FIG. 1B illustrates a method of performing PIT model training for speech recognition training. In operation S110, input feature Y for the model for is received. The input feature may be input feature maps. In operation S120, the input features are fed into a recurrent neural network (RNN) and RNN operations are performed. The RNN operations may further include BLSTM-RNN operations. Next, in operation S130, the output of the RNN operations fed through a linear layer for each speaker individually. Thereafter, in operation S140, softmax activations are separately computed on the outputs from the linear layer.

In operation S150, pairwise scoring is performed, in which, cross entropy loss is computed between any pair of (prediction[i], label[j]), label inputs for the input features Y are input as labels1 and labels2 and the output of the softmax activation in softmax1 and softmax2 may be considered as predictions1 and predictions2. For instance, in illustrative FIG. 1A, the cross entropy loss may be computed between (predictions1, labels1), (predictions1, labels2), (prediction2, labels1) and (prediction2, labels2).

In operation S160. the cross entropy losses (error) are accumulated together for every possible assignment of labels to each prediction, which is the permutations of labels' orders. For instance, in assignment1, the cross entropy losses (error) are accumulated together for every possible assignment of labels to predictions1 and in assignment2, the cross entropy losses (error) are accumulated together for every possible assignment of labels to prediction2.

In operation S170, assignment, among assignment1 and assignment2, with the minimum cross entropy loss is selected as the final error, and in operation S180, the model is updated based on the determined final error.

The key ingredient in PIT is its training criterion and the objective function in PIT is defined as $$J = \frac{1}{S} \min_{s' \in permu(S)} \sum_s \sum_t CE(l_t^{s'_s}, y_t^s)$$

where s is a permutation of [1, 2, . . . , S], $l^s$ be the ground truth alignment, $y^s$ be estimated state-posterior of stream s, $l_t^{s'_s}$ is the ground truth label of stream $s'_s$ at frame t. PIT aims to minimize the minimal average cross entropy (CE) of the whole utterance among all possible assignments of the reference to the estimated posterior.

With this criterion, the network can automatically estimate the assignment. The CE is computed over the whole utterance so that all frames that belong to the same speaker are forced to be aligned with the same output segment (or branch). Moreover, compared to Deep clustering (DPLC) or DANet, the PIT structure in FIG. 1A is much simpler since it allows direct multi-talker mixed speech recognition without explicit separation. After the PIT model training, the individual output posterior stream can be used for decoding as normal to obtain the final recognition result.

In some speech recognition systems, a TS training may use the posterior probability generated by the teacher as the supervision, instead of using only hard labels in traditional machine learning tasks. The objective function in the TS training is defined as $$CE(\theta; O, L) = -\sum_t \sum_y p'(y|o_t)\log p_\theta(y|o_t) \quad (2)$$

$$p'(y|o_t) = \lambda p_{teacher}(y|o_t) + (1-\lambda)p_t^{ref}(y) \quad (3)$$

where $p_\theta(y|o_t)$ is the posterior generated by the student model, $p_t^{ref}(y)$ is the reference distribution and is represented by a Kronecker delta function $p_t^{ref}(y)=\delta(y,l_t^{ref})$, and $l_t^{ref}$ is the ground truth label, which is usually referred to as hard label. $p_{teacher}(y|o_t)$ is the posterior probability estimated by the teacher model, which is also referred to as soft label because it is not a one-hot vector. $\lambda$ is the interpolation weight, which is a hyper parameter.

In the related art TS training, knowledge is transferred from a large and complicated teacher network to a small student network to help reduce model footprint. The student tries to mimic the teacher by using the soft labels estimated by the teacher. The soft label is referred to as dark knowledge and is considered more important than hard labels for deep learning.

Although the TS training in PIT framework has been used for single-channel multi-talker speech recognition, the accuracy of speech recognition is still unsatisfactory and is far from the accuracy of the normal single-talker ASR scenario. To further improve the system performance, so it can be enabled to address the multi-talker mixed speech in real scenario, a new architecture based PIT with a refined training pipeline is constructed.

Figure 2:
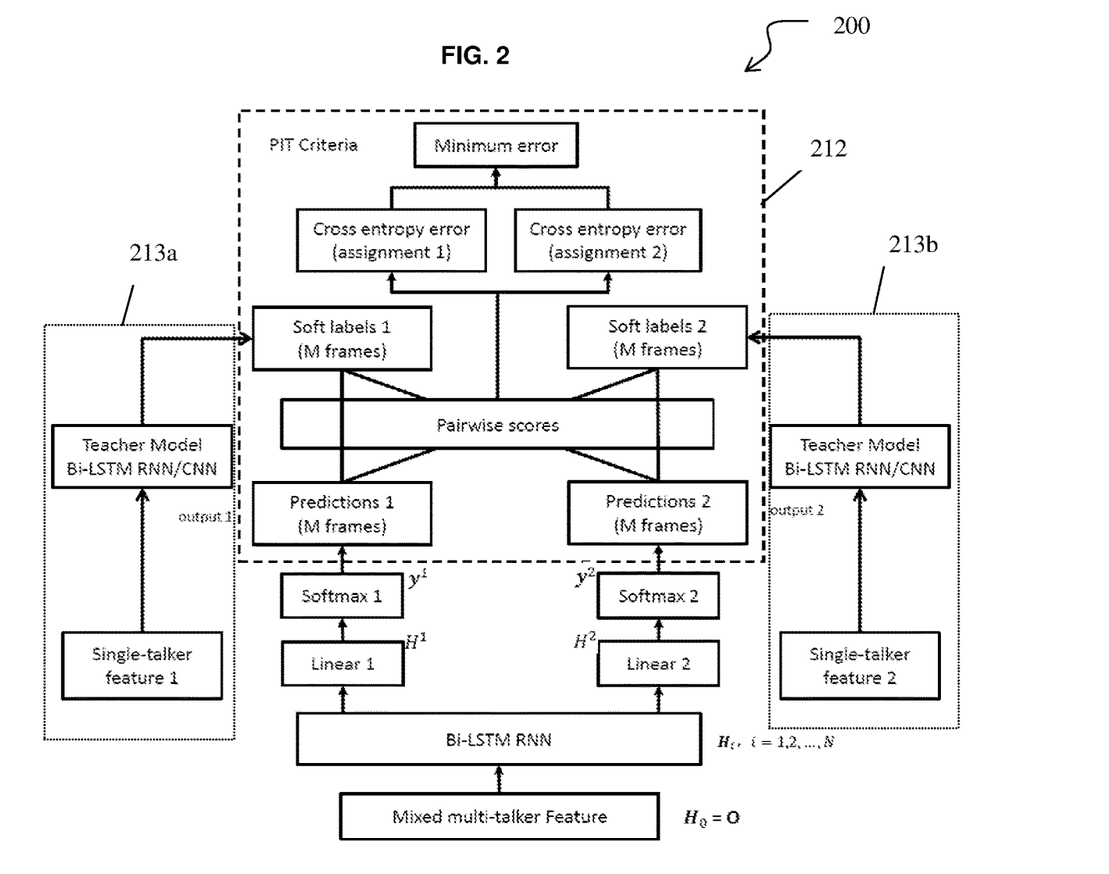
FIG. 2 is a block diagram illustrating a TS permutation invariant training architecture according to an embodiment.

One or more embodiments of the present disclosure may overcome the deficiencies of the conventional and related art techniques, by providing new techniques and technologies that improve system performance. According to one or more embodiments, FIG. 2 is a block diagram illustrating the teacher-student (TS) permutation invariant training (PIT) architecture 200 according to an embodiment. The TS PIT architecture 200 may include a PIT feature 212 and a teacher model features 213a and 213b. According to another embodiment, the TS PIT may not include all of the PIT feature 212 and the teacher model features 213a and 213b.

According to an embodiment, the PIT feature 212 and the teacher model features 213a and 213b may integrate the knowledge distillation with TS learning into the PIT framework. For instance, the teacher model features 213a and 213 transfer knowledge from a single-talker speech recognition model (the teacher) to a multi-talker PIT feature 212 (the student) to improve the recognition accuracy of the PIT feature 212.

According to an embodiment, parallel data of original individual single-talker speech and the corresponding multi-talker mixed speech, are used by the teacher model features 213a and 213 and the multi-talker PIT feature 212. As illustrated in FIG. 2, the inputs to the teacher model are original single-talker speech streams $$o_t^{s'_s},$$

and the inputs to the student model are the corresponding multi-talker mixed speech $o_t$. The training criterion in this architecture is $$J = \frac{1}{S} \min_{s' \in permu(S)} \sum_s \sum_t \sum_y p'(y|o_t^{s'_s})\log p_\theta^s(y|o_t) \quad (4)$$

$$p'(y|o_t^{s'_s}) = \lambda p_{teacher}(y|o_t^{s'_s}) + (1-\lambda)p_{t,s'_s}^{ref}(y) \quad (5)$$

where $$p_\theta^s(y|o_t)$$

is posterior of stream s estimated by the multi-talker speech recognition model, $$p_{t,s'_s}^{ref}(y) = \delta(y, l_t^{s'_s})$$

is a reference distribution, and $$p_{teacher}(y \mid o_t^{s'_s})$$

is posterior estimated by the single-talker speech recognition model using original single-talker speech stream $s'_s$.

According to the embodiment in FIG. 2, the TS PIT technique minimizes the minimal average CE among all possible assignment between model outputs and soft labels, as compared to the PIT illustrated in FIGS. 1A and 1B.

According to another embodiment. the soft labels may be generated by using an ensemble of teachers, instead of using a single teacher. For instance, an ensemble of teachers may be generated such that $$p_{teacher}(y \mid o_t^{s'_s}) = \sum_k w_k p_k(y \mid o_t^{s'_s}) \quad (6)$$

wherein $$w_k \in [0, 1] \text{ and } \sum_k w_k = 1$$

are interpolation weights and $$p_k(y_t^{s'_s} \mid o_t)$$

is the posterior estimated by the different plurality of single-talker speech recognition models.

According to yet another embodiment, the soft label is generated using an ensemble of a plurality of different single-talker speech recognition models one by one, in ascending order of recognition performance on corresponding single-talker tasks. For instance, according to an embodiment, the soft label may be generated using Algorithm 1 as follows:

---
Algorithm 1 Progressive ensemble teacher-student training
---
1:   Sort teacher models in ascending order of the performance on single-talker task.
2:   for each i in all teachers do
3:     for each j in all minibatches of training data do
4:       Generate soft-targets for minibatch j using teacher model i
5:       Update neural network model with minibatch j
6:     end for
7:     Repeat 3 until converge
8:   end for According to an embodiment, the TS training may be further extended by exploiting large amount of unlabeled data. In the related art TS training, the target distribution is a weighted sum of the hard and soft labels. However, according to an embodiment, when unlabeled data are used, only the posterior estimated by the teacher model is used as the supervision, i.e., $$J = \frac{1}{S} \min_{s' \in permu(S)} \sum_s \sum_t \sum_y p_{teacher}(y \mid o_t^{s'_s}) \log p_\theta(y \mid o_t) \quad (7)$$

Moreover, parallel data used as inputs to the model may be generated by varying the relative energy of the involved talkers without transcribing the source streams.

According to this approach, fast domain adaptation with only untranscribed target domain speech may be conducted according to an embodiment. More specifically, a general PIT-based multi-talker ASR model is first trained and then in-domain speech waveform without transcription is collected and used to adapt a general model to generate the domain-dependent model.

Figure 3:
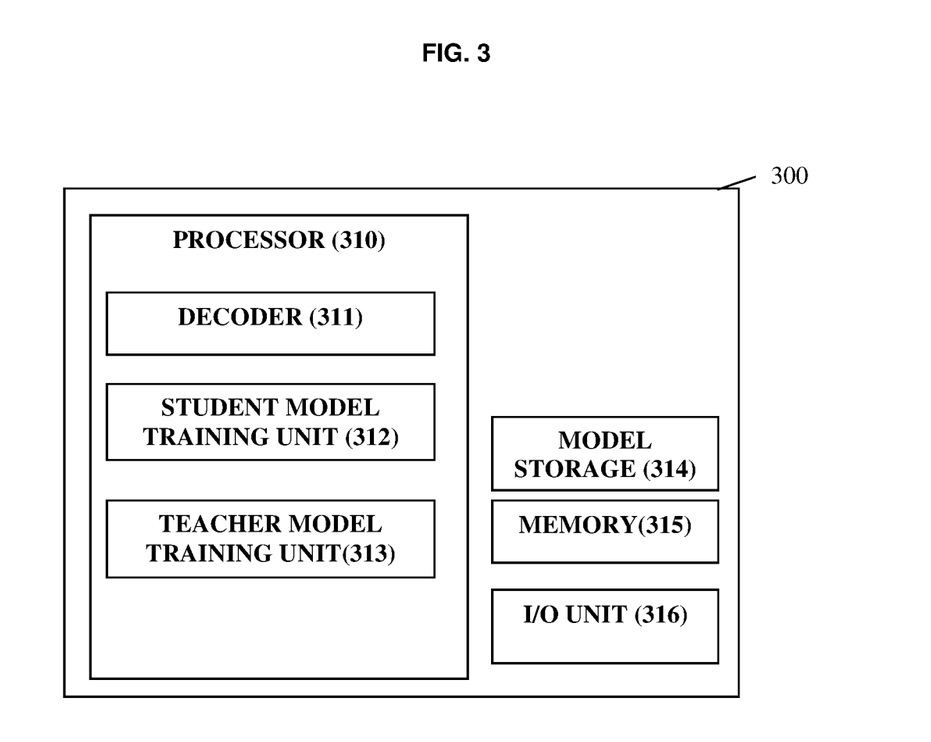
FIG. 3 is an apparatus implementing the TS permutation invariant training architecture in FIG. 2 according to an embodiment.

FIG. 3 shows an apparatus 300 implementing the TS PIT architecture 200 according to an embodiment. The apparatus 300 may include a processor 310, model storage 314, memory 315 and input/output unit 316. According to an embodiment, the processor 310 may be further configured to implement a decoder 311, a student model training unit 312 and a teacher model training unit 313. According to another embodiment, the processor 310 may not implement all of the decoder 311, the student model training unit 312 and the teacher model training unit 313. Instead, the apparatus 300 may include some of the decoder 311, the student model training unit 312 and the teacher model training unit 313.

According to an embodiment, the model storage 316 may be configured to store an acoustic model, bidirectional long-short term memory, recurrent neural networks, convolutional neural network, and other models and networks associated with PIT.

According to an embodiment, the processor 310 may be configured to receive a stream of speech data through the I/O unit 316. According to an embodiment, the stream of speech data may include speech data from multiple speakers speaking at the same time and may further include only a single channel of mixed speech data. Also, the speech data may have structures along both time and frequency axes.

According to an embodiment, the student model training unit 312 may be configured to perform the PIT feature 212 illustrated in FIG. 2, the teachings model training unit 313 may be configured to perform the teacher model features 213a and 213b illustrated in FIG. 2 and the decoder 311 may decode speech data based on the PIT model training.

Figure 4:
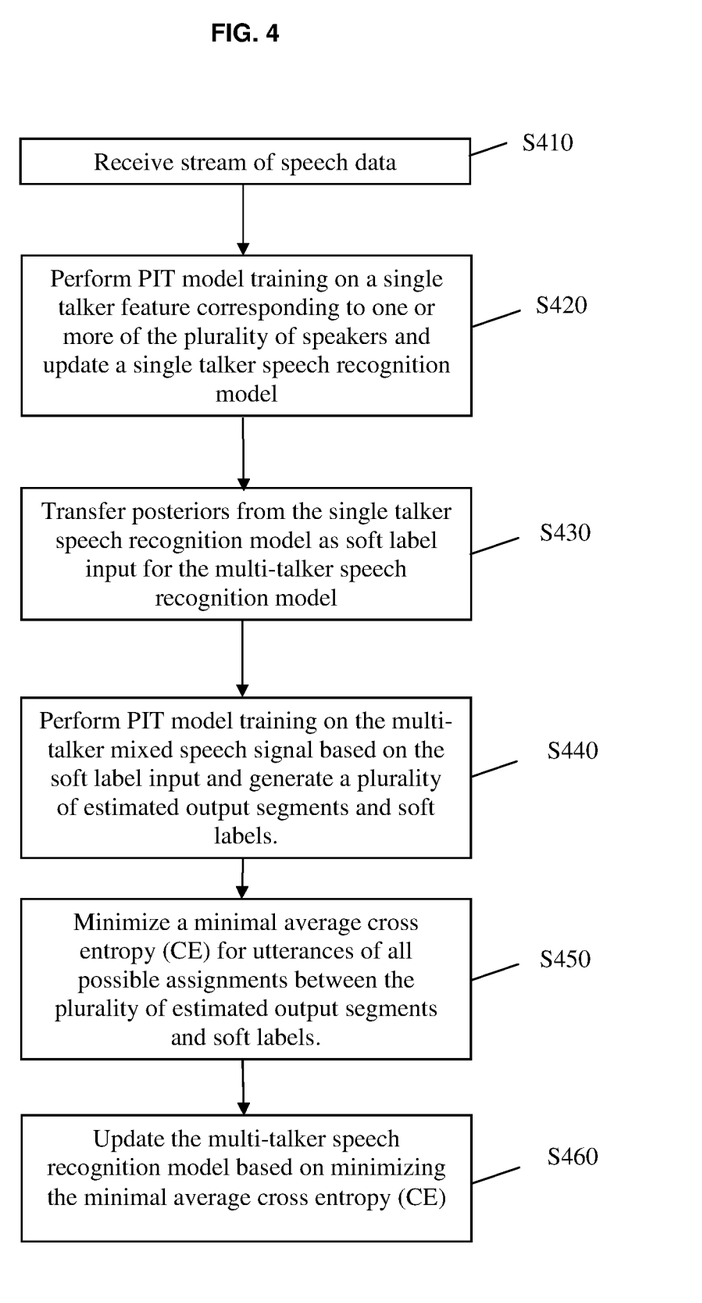
FIG. 4 is flowchart illustrating operations of the TS permutation invariant training architecture in FIG. 2 according to an embodiment.

FIG. 4 is flowchart illustrating operations of the TS PIT architecture of FIG. 2 according to an embodiment.

At S410, a processor may receive a stream of speech data. According to an embodiment, the stream of speech data may include speech data from multiple speakers speaking at the same time and may further include only a single channel of mixed speech data. Also, the speech data may have structures along both time and frequency axes.

At S420, the processor may perform PIT model training on a single talker feature corresponding to one or more of the plurality of speakers and update a single talker speech recognition model. According to an embodiment, the single talker speech recognition model is a teacher model.

At S430, the processor may transfer posteriors from the single talker speech recognition model as soft label to be input for the multi-talker speech recognition model. According to an embodiment, the multi-talker speech recognition model is a student model.

At S440, the processor may perform PIT model training on the multi-talker mixed speech signal based on the soft label input from the single talker speech recognition model and generate a plurality of estimated output segments.

At S450, the processor may minimize a minimal average cross entropy (CE) for utterances of all possible assignments between the plurality of estimated output segments and soft labels.

At S460, the processor may update a multi-talker speech recognition model based on minimizing the minimal average cross entropy (CE).

According to one or more embodiments, the TS learning is integrated into the PIT framework to form a new architecture for single-channel multi-talker speech recognition, which further improves the system performance.

According to one or more embodiments, the PIT model training uses a PIT model with 6 BLSTM layers. As such, the model is smaller and more compact that a progressive model with totally 10 BLSTM layers (6+4=10 BLSTM layers) in conventional system.

According to one or more embodiments, different structure including CNN, BLSTM and the ensemble of CNN and BLSTM may be implemented as the teacher model, which further improves the system performance.

According to one or more embodiments, in the ensemble teacher, the teacher models may be sorted in ascending order of the performance on single-talker task, which further improves the system performance.

According to one or more embodiments, an unsupervised learning scheme to do data augmentation for multi-talker speech recognition may be performed. Moreover, the unsupervised learning scheme can also be utilized to fast adapt the PIT model into a new domain without transcribed data.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor, hardware circuitry or any other device capable of responding to and executing instructions in a defined manner. The processing device also may access, store, manipulate, process, and create data in response to execution of the software.

The software may include a computer program, a piece of code, an instruction, or some combination thereof, to independently or collectively instruct or configure the processing device to operate as desired. The method according to the above-described example embodiments may be recorded in non-transitory computer-readable media including program instructions to implement various operations of the above-described example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like.

Experimental Results

Some results comparisons are illustrated as the following tables:

PIT+TS vs. PIT according to an embodiment.

TABLE 2

WER (%) of the PIT model with teacher-student training using different configurations on the 80 hr AMI IHM-2mix dataset. TS means teacher-student training.

| Model | Init | λ | WER SPK1 | WER SPK2 |
|---|---|---|---|---|
| PIT | Random | — | 55.21 | 64.23 |
| +TS | PIT | 0.5 | 52.44 | 60.49 |
|  |  | 1 | 51.84 | 60.34 |
|  | Random | 0.5 | 51.28 | 59.27 |
|  |  | 1 | 51.07 | 59.12 |

Ensemble vs. non-ensemble

TABLE 3

WER (%) of the teacher-student training using ensemble of single-speaker teacher models on 80 hr AMI IHM-2mix dataset.

| Model | Teacher | WER SPK1 | WER SPK2 |
|---|---|---|---|
| PIT | — | 55.21 | 64.23 |
| +TS | BLSTM | 51.07 | 59.12 |
|  | CNN | 48.95 | 57.52 |
|  | BLSTM + CNN: interpolated | 49.34 | 57.78 |
|  | BLSTM + CNN: progressive | 48.03 | 56.46 |

Unsupervised learning to do data augmentation

TABLE 4

Compare WER (%) with and without using the untranscribed data in the teacher-student training framework on the AMI IHM-2mix dataset

| Model | Teacher | Data | Label | WER SPK1 | WER SPK2 |
|---|---|---|---|---|---|
| PIT | — | 80 hr | Labeled | 55.21 | 64.23 |
|  | — | 400 hr | Labeled | 49.19 | 57.06 |
| +TS | BLSTM | 80 hr | Labeled | 51.07 | 59.12 |
|  |  | +320 hr | Unlabeled | 45.11 | 53.31 |
|  | CNN | 80 hr | labeled | 48.95 | 57.52 |
|  |  | +320 hr | Unlabeled | 44.59 | 52.25 |
|  | BLSTM + CNN | 80 hr | labeled | 48.03 | 56.46 |
|  |  | +320 hr | Unlabeled | 43.58 | 51.29 |

Unsupervised learning for fast domain adaptation

TABLE 5

Efficient domain adaptation from AMI Meeting speech to WSJ Reading speech for multi-talker speech recognition with only untranscribed WSJ data. WER (%) on WSJ-2mix

| System | Teacher | WER |
|---|---|---|
| PIT Baseline AMI 80 hr | — | 51.81 |
| +WSJ domain adaptation | AMI BLSTM | 38.77 |
| PIT-TS AMI 400 hr | AMI BLSTM | 43.50 |
| +WSJ domain adaptation | AMI BLSTM | 36.59 |
| PIT-TS AMI 400 hr | AMI BLSTM + CNN | 38.56 |
| +WSJ domain adaptation | AMI BLSTM + CNN | 35.21 |

The present disclosure has been described above with reference to embodiments. However, those of ordinary skill in the art will understand that various changes in form and details may be made therein without departing from the spirit and scope of the present disclosure as defined by the appended claims. Therefore, the above embodiments should be considered in descriptive sense only and not for purposes of limitation. Thus, the scope of the present disclosure may be defined not by the above detailed descriptions but by the appended claims, and all differences within the scope will be construed as being included in the present disclosure.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of performing speech recognition training performed by at least one processor, the method comprising:
   acquiring, by the at least one processor, a multi-talker mixed speech signal from a plurality of speakers;
   performing, by the at least one processor, permutation invariant training (PIT) model training on the multi-talker mixed speech signal based on knowledge from a single-talker speech recognition model; and
   updating, by the at least one processor, a multi-talker speech recognition model based on a result of the PIT model training.

2. The method of claim 1, wherein the single-talker speech recognition model is a teacher model, and the multi-talker speech recognition model is a student model.

3. The method of claim 1, wherein the PIT model training uses labels from the single-talker speech recognition model, the labels being posteriors from inputting a single-talker data corresponding to one or more of the plurality of speakers into the single-talker speech recognition model.

4. The method of claim 1, further comprises:
   performing PIT model training on a single talker feature corresponding to one or more of the plurality of speakers; and
   transferring posteriors from the performing the PIT model training on the single talker feature as soft label input for the multi-talker speech recognition model.

5. The method of claim 1, wherein the performing PIT model training comprises:
   performing a bidirectional long-short term memory (BLSTM) operation on the multi-talker mixed speech signal by assigning soft labels that are posteriors from inputting a single-talker data corresponding to one or more of the plurality of speakers into the single-talker speech recognition model and generating a plurality of estimated output segments for multi-talker mixed speech signal; and
   minimizing a minimal average cross entropy (CE) for utterances of all possible assignments between the plurality of estimated output segments and soft labels.

6. The method of claim 1, wherein the minimal average cross entropy (CE) is determined based on equation (1) and (2):

$$J = \frac{1}{S} \min_{s' \in permu(S)} \sum_{s} \sum_{t} \sum_{y} p'(y \mid o_t^{s'_s}) \log p_\theta^s(y \mid o_t) \quad (1)$$

$$p'(y \mid o_t^{s'_s}) = \lambda p_{teacher}(y \mid o_t^{s'_s}) + (1 - \lambda) p_{t,s'_s}^{ref}(y) \quad (2)$$

where $$p_\theta^s(y \mid o_t)$$

is posterior of stream s estimated by the multi-talker speech recognition model, $$p_{t,s'_s}^{ref}(y) = \delta(y, l_t^{s'_s})$$

is a reference distribution, and $$p_{teacher}(y \mid o_t^{s'_s})$$

is posterior estimated by the single-talker speech recognition model using original single-talker speech stream $s'_s$.

7. The method of claim 1, wherein the PIT model training comprises:
   performing a bidirectional long-short term memory recurrent neural networks (BLSTM-RNN) operation on the multi-talker mixed speech signal by assigning soft labels that are posteriors from the single-talker speech recognition model.

8. The method of claim 4, wherein the soft label is generated using an ensemble of a plurality of different single-talker speech recognition models such that $$p_{teacher}(y \mid o_t^{s'_s}) = \sum_{k} w_k p_k(y \mid o_t^{s'_s})$$

wherein $$w_k \in [0, 1] \text{ and } \sum_{k} w_k = 1$$

are interpolation weights and $$p_k(y_t^{s'_s} \mid o_t)$$

is the posterior estimated by the different plurality of single-talker speech recognition models.

9. The method of claim 4, wherein the soft label is generated using an ensemble of a plurality of different single-talker speech recognition models one by one, in ascending order of recognition performance on corresponding single-talker tasks.

10. A speech recognition training apparatus comprising:
    at least one memory operable to store program code; and
    at least one processor operable to read said program code and operate as instructed by said program code, said program code comprising:
        acquiring code configured to acquire a multi-talker mixed speech signal from a plurality of speakers;
        training code configured to perform permutation invariant training (PIT) model training on the multi-talker mixed speech signal based on knowledge from a single-talker speech recognition model; and updating code configured to update a multi-talker speech recognition model based on a result of the PIT model training.

11. The speech recognition training apparatus of claim 10, wherein the single-talker speech recognition model is a teacher model, and the multi-talker speech recognition model is a student model.

12. The speech recognition training apparatus of claim 10, wherein the PIT model training uses labels from the single-talker speech recognition model, the labels being posteriors from inputting a single-talker data corresponding to one or more of the plurality of speakers into the single-talker speech recognition model.

13. The speech recognition training apparatus of claim 10, wherein the training code is further configured to:

perform PIT model training on a single talker feature corresponding to one or more of the plurality of speakers; and transfer posteriors from the performing the PIT model training on the single talker feature as soft label input for the multi-talker speech recognition model.

14. The speech recognition training apparatus of claim 10, wherein the training code is further configured to:

perform a bidirectional long-short term memory (BLSTM) operation on the multi-talker mixed speech signal by assigning soft labels that are posteriors from inputting a single-talker data corresponding to one or more of the plurality of speakers into the single-talker speech recognition model and generating a plurality of estimated output segments for multi-talker mixed speech signal; and minimize a minimal average cross entropy (CE) for utterances of all possible assignments between the plurality of estimated output segments and soft labels.

15. The speech recognition training apparatus of claim 10, wherein the minimal average cross entropy (CE) is determined based on equation (1) and (2):

$$J = \frac{1}{S} \min_{s' \in permu(S)} \sum_s \sum_t \sum_y p'(y \mid o_t^{s'_s}) \log p_\theta^s(y \mid o_t) \quad (1)$$

$$p'(y \mid o_t^{s'_s}) = \lambda p_{teacher}(y \mid o_t^{s'_s}) + (1-\lambda) p_{t,s'_s}^{ref}(y) \quad (2)$$

where $$p_\theta^s(y \mid o_t)$$

is posterior of stream s estimated by the multi-talker speech recognition model, $$p_{t,s'_s}^{ref}(y) = \delta(y, l_t^{s'_s})$$

is a reference distribution, and $$p_{teacher}(y \mid o_t^{s'_s})$$

is posterior estimated by the single-talker speech recognition model using original single-talker speech stream $s'_s$.

16. The speech recognition training apparatus of claim 10, wherein the PIT model training comprises:

performing a bidirectional long-short term memory recurrent neural networks (BLSTM-RNN) operation on the multi-talker mixed speech signal by assigning soft labels that are posteriors from the single-talker speech recognition model.

17. The speech recognition training apparatus of claim 13, wherein the soft label is generated using an ensemble of a plurality of different single-talker speech recognition models such that $$p_{teacher}(y \mid o_t^{s'_s}) = \sum_k w_k p_k(y \mid o_t^{s'_s})$$

wherein $$w_k \in [0, 1] \text{ and } \sum_k w_k = 1$$

are interpolation weights and $$p_k(y_t^{s'_s} \mid o_t)$$

is posterior estimated by the different plurality of single-talker speech recognition models.

18. The speech recognition training apparatus of claim 13, wherein the soft label is generated using an ensemble of a plurality of different single-talker speech recognition models one by one, in ascending order of recognition performance on corresponding single-talker tasks.

19. A non-transitory computer readable medium having stored thereon a program for a method of performing speech recognition, the method comprising:

acquiring a multi-talker mixed speech signal from a plurality of speakers;

performing permutation invariant training (PIT) model training on the multi-talker mixed speech signal based on knowledge from a single-talker speech recognition model; and updating a multi-talker speech recognition model based on a result of the PIT model training.

* * * * *